May 10, 1949.  D. E. MEITZLER  2,469,739
STARTING CONTROL FOR FREE-PISTON UNITS
Filed Aug. 23, 1944  5 Sheets-Sheet 1

INVENTOR
Donald E. Meitzler

May 10, 1949. D. E. MEITZLER 2,469,739
STARTING CONTROL FOR FREE-PISTON UNITS
Filed Aug. 23, 1944 5 Sheets-Sheet 4

INVENTOR
Donald E. Meitzler

Patented May 10, 1949

2,469,739

UNITED STATES PATENT OFFICE 2,469,739

STARTING CONTROL FOR FREE-PISTON UNITS

Donald E. Meitzler, Manchester, Conn., assignor to United Aircraft Corporation, East Hartford, Conn., a corporation of Delaware Application August 23, 1944, Serial No. 550,894

6 Claims. (Cl. 230—56)

This invention relates to a control for a starting system for free-piston units.

The copending application of Cooper, Serial No. 550,875, filed August 23, 1944, issued as Patent 2,439,453, describes a starting system in which the pistons are automatically moved into starting position and then gas is admitted to the air springs to move the pistons rapidly toward each other for starting the unit. If the unit fails to start on the first attempt, the system is adapted to function repeatedly so long as gas under pressure is supplied to it. A feature of the present invention is a cut-off valve for the starting system automatically to stop its functioning while the unit is operating.

A feature of the invention is a control of the gas supply to the starting system to cause the starting system to function if the free-piston unit stalls.

The copending application of Kalitinsky, Serial No. 550,883, filed August 23, 1944, issued as Patent 2,420,483, describes a stroke indicator which produces a varying pressure dependent upon the position of the piston at the end of its stroke. A feature of the present invention is the automatic control of the starting system by a stroke indicator of this character.

Other objects and advantages will be apparent from the specification and claims, and from the accompanying drawings which illustrate an embodiment of the invention.

Figure 1:
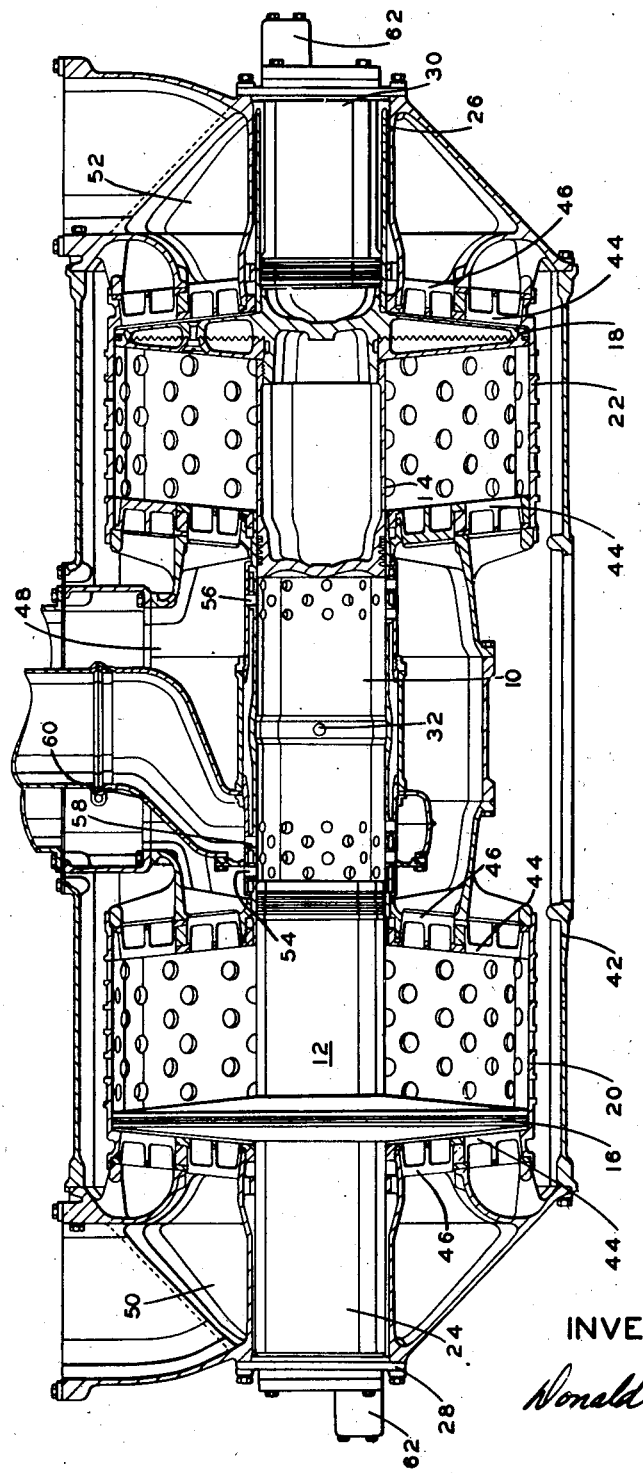
Fig. 1 is a sectional view through the free-piston unit showing the starting system.
Figure 2:
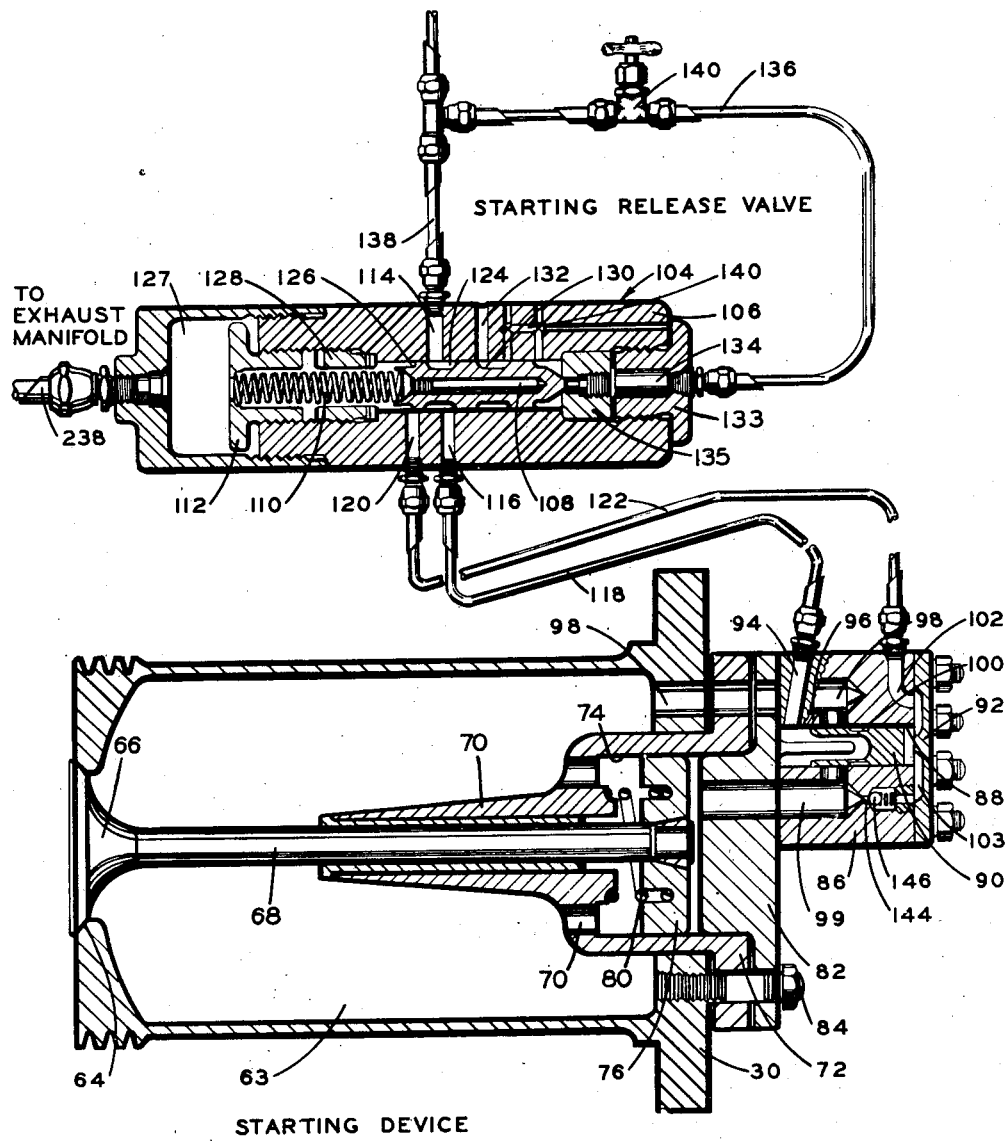
Fig. 2 is a diagrammatic view of the starting system.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves reciprocate over stationary pistons 28 and 30 and form air spring cylinders.

Figure 4:
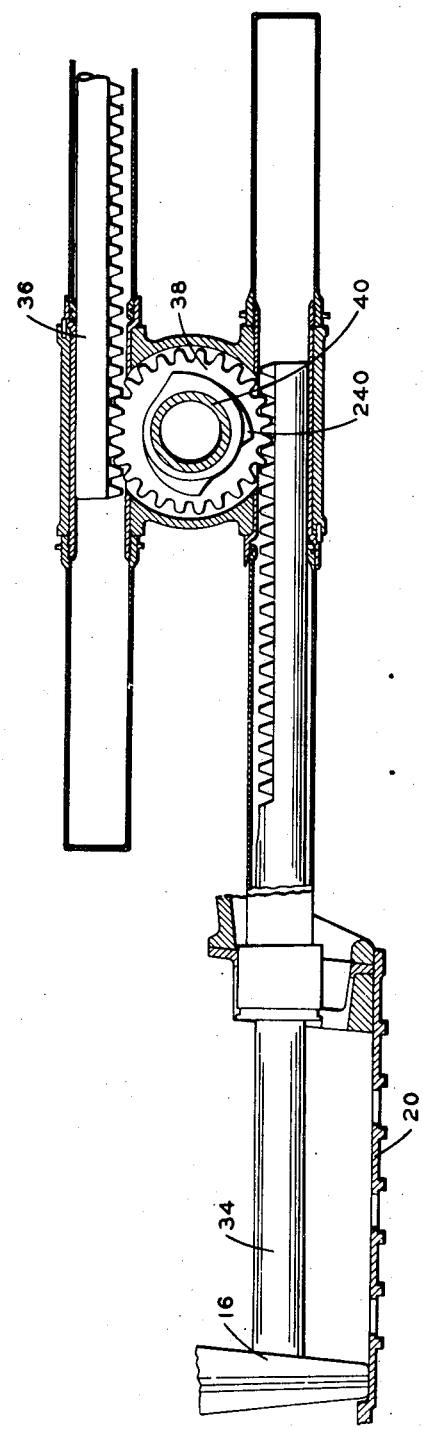
Fig. 4 is a sectional view through the restraining linkage for the pistons.

The piston assemblies are moved apart by the burning of fuel injected into engine cylinder 10 through one or more nozzles 32. Air compressed in the air spring cylinders on the power stroke returns the piston assemblies. The assemblies are always maintained at equal distances from the center of the engine cylinder by a linkage, which may include racks 34 and 36, Fig. 4, projecting from the piston assemblies and meshing with a pinion 38 on a shaft 40.

In take manifold 42 conducts air to intake valves 44 in the heads of the compressor cylinders through which air alternately enters opposite ends of the compressor cylinders. The compressed air leaves the cylinders through discharge valves 46, also at opposite ends of the compressor cylinders and passes into a central scavenge chamber 48 and end chambers 50 and 52. These chambers may be interconnected by a scavenge manifold, not shown. Compressed gas from the chambers enters engine ports 54 and 56 which are uncovered by pistons 12 and 14 at the end of the power stroke, thereby permitting air to be blown through the engine cylinder. Gas and air in the engine cylinders is discharged through exhaust ports 58 into exhaust manifold 60.

Starting devices 62 for the unit are mounted in the air spring pistons 28 and 30. The devices are similar and only one device will be described in detail. Piston 30 forms a housing having an accumulator chamber 63 in which gas under pressure is collected in readiness for starting. This chamber communicates with the air spring cylinder through a port 64 closed by a poppet valve 66. The stem 68 of this valve is slidable in a guide 70 on a cap 72 which closes the end of chamber 62. Valve 66 closes port 64 by movement toward the storage chamber and is opened by movement away from the chamber so that pressure of gas within the chamber opens the valve. Pressure of gas in the air spring tends to hold the valve closed during operation of the unit.

Cap 72 has a bore forming a cylinder 74 which receives a piston 76 on the end of valve stem 68. The inner end of cylinder 74 is connected with the storage chamber by one or more ports 78. A coil spring 80 in the cylinder moves the piston toward valve closing position. A head 82 closes the outer end of cylinder 74 and is held in position by studs 84 extending through both head 82 and cap 72.

A casing 86 on head 82 has a bore 88 in which a plunger 90 is slidable. One end of bore 88 is closed by head 82, the other end by a cover plate 92. Gas under pressure is admitted to the inner end of bore 88 through a channel 94 in casing 86. With plunger 90 in the position shown, gas entering the inner end of the bore is guided into chamber 63 through a channel 96 communicating with a passage 98 in casing 86, cap 82, and head 72, and the head of piston 30.

Passage 98 intersects bore 88 in alignment with another passage 99 which communicates with the outer end of cylinder 74. Plunger 90 is normally in a position to cut off fluid connection between passages 98 and 99, and has a groove 100, which, when the plunger is moved to the opposite end of its stroke, connects these passages and permits gas to flow through channel 99 into the outer end of cylinder 74, to cause valve 66 to open.

For moving plunger 90 to the inner end of its stroke, casing 86 has a gas inlet passage 102 which is connected by a groove 103 in plate 92 to the outer end of bore 88. When gas under pressure enters this inlet passage, it moves plunger 90 into a position to close channel 96 and to connect passages 98 and 99 to establish fluid connection between chamber 62 and the outer end of cylinder 74. When this occurs, the pressures on opposite sides of piston 76 are balanced and the pressure on valve 66 opens the valve for the escape of gas into the air spring.

In starting the unit, gas under pressure is first admitted through channel 94 until a predetermined pressure is built up in chamber 63 as hereinafter described. After this pressure is reached, gas under pressure is admitted through passage 102 thereby moving plunger 90 to close channel 96 and to cause valve 66 to open. Before this action occurs, the piston assemblies of the unit will have been moved to starting position. The sudden inrush of air into the air springs from chambers 62 in starting devices 56 and 58 will move the piston assemblies rapidly toward each other.

The starting devices 56 and 58 may be controlled by an automatically operating valve 104 which controls the admission of gas under pressure to channel 94 and passage 102. Valve 104 includes a casing 106 having a bore in which a valve plunger 108 is mounted, the plunger being normally held in the position shown by a spring 110. The tension of spring 110 may be adjusted by a nut 112 engaging threads in casing 106 to control the pressure in chamber 62 at which the starting device operates.

Casing 106 has an inlet port 114 connected to a source of gas under pressure, and an outlet port 116 connected by a conduit 118 to channel 94. Another outlet port 120 spaced from port 116 is connected by a conduit 122 to passage 102. In the normal position of plunger 108 a groove 124 in the plunger connects ports 114 and 116 and another groove 126 establishes fluid connection from port 120 to a chamber 127 at the end of casing 106. When plunger 108 is shifted to the other end of the stroke, as limited by a threaded ring 128, groove 124 connects inlet port 114 with port 120, and another groove 130 connects port 116 to a vent port 132.

For moving plunger 108, the end of casing 106 has a nut 133 with a through passage 134. Nut 133 clamps a bushing 135, the end of which forms a valve seat engaged by the end of plunger 108. Passage 134 is connected by a branch conduit 136 to conduit 138 which connects with inlet port 114. Branch conduit 136 has an adjustable throttle valve 140 which can provide a restriction greater than any restriction from conduit 138 to chamber 63. When the desired pressure is developed in chamber 63, the pressure in passage 134 acting on the end of plunger 108 moves the plunger against the action of spring 110 to connect port 120 to inlet port 114 for procuring opening of valve 66 for starting the unit.

A small bleed passage 140 in casing 106 provides fluid connection from the end of plunger 108 to groove 130 which connects with vent port 132. This permits gas leaking past the end of plunger 108 to be vented so that the plunger will not be moved from the position shown until the desired pressure has been built up in chamber 62.

A passage 144 in casing 86 connects passage 99 with groove 103 in cap 92 and is closed by a check valve 146. After the starting unit has operated and conduit 122 is vented by plunger 108 returning to the position shown, gas at the right of piston 76 in cylinder 74 may escape past valve 146 so that piston 76 may move into a position for closing poppet valve 66.

The piston assemblies may be automatically moved to the outer ends of their stroke before the starting devices operate. The structure is the same for each piston assembly and only one of the structures will be described. Compressor piston 18 has projecting concentric sleeves 148 and 149, Fig. 3, connected at their outer ends to form a plunger 150 sliding in an annular space 151 between a sleeve 152 and a smaller sleeve 153 mounted within the unit. Only one plunger is shown, but, for purposes of balance, two oppositely placed plungers may be advantageous.

Gas under pressure is admitted to the left hand end of space 151 to move the piston assembly of which piston 18 is a part. A valve casing 154 has a sliding plunger valve 156 held in the position shown by a spring 158. In this position gas entering an inlet port 160 passes around a groove 162 in valve 156 to an outlet port 164 connected by a conduit 166 to the end of a bore 168 in a casing 170 at the end of sleeve 152. From bore 168 gas under pressure passes through a channel 172 in casing 170 and a channel 174 in head 175 on sleeves 152 and 153 to the inner end of space 151. Gas entering the end of this cylinder moves plunger 150 to the right, carrying with it the attached piston assembly and moving the piston assembly into starting position.

As plunger 150 moves to the right, it uncovers a port 176 connected by a conduit 178 to a passage 180 in a cap 181 in the end of casing 154. Gas entering this passage acts on the end of valve plunger 156 which is in the form of a valve engaging a seat 182 in a ring 183 at the end of passage 180 and moves the plunger to the left against the force of spring 158. Inlet port 160 is then connected by groove 162 to a port 184 which is connected by conduit 138 to the starting release valve.

When valve plunger 156 is moved to the left, port 164 is connected by a groove 186 in plunger 156 to a vent port 188 causing a pressure drop in conduit 166 and permitting a check valve in the form of a plunger 190 in bore 168 to be moved by a spring 192 to close passage 172.

After the engine is started, plunger 150 acts as a pump forcing gas under pressure through passage 174 past a disc valve 194 and through a channel 196 to a conduit 198 leading to the left hand end of casing 154. Pressure entering the casing acts on the end of valve plunger 156 to return it to the position shown. While gas under pressure is being admitted to the balance pump, valve 190 is moved into a position to close passage 196. This passage is opened upon return of valve 190 to the normal position shown.

The starting system above described is claimed in the copending application of Cooper, Serial No. 550,875, filed August 23, 1944. The present invention relates to the arrangement by which the supply of starting air to the starting system may be automatically cut off when the unit is operating.

Figure 3:
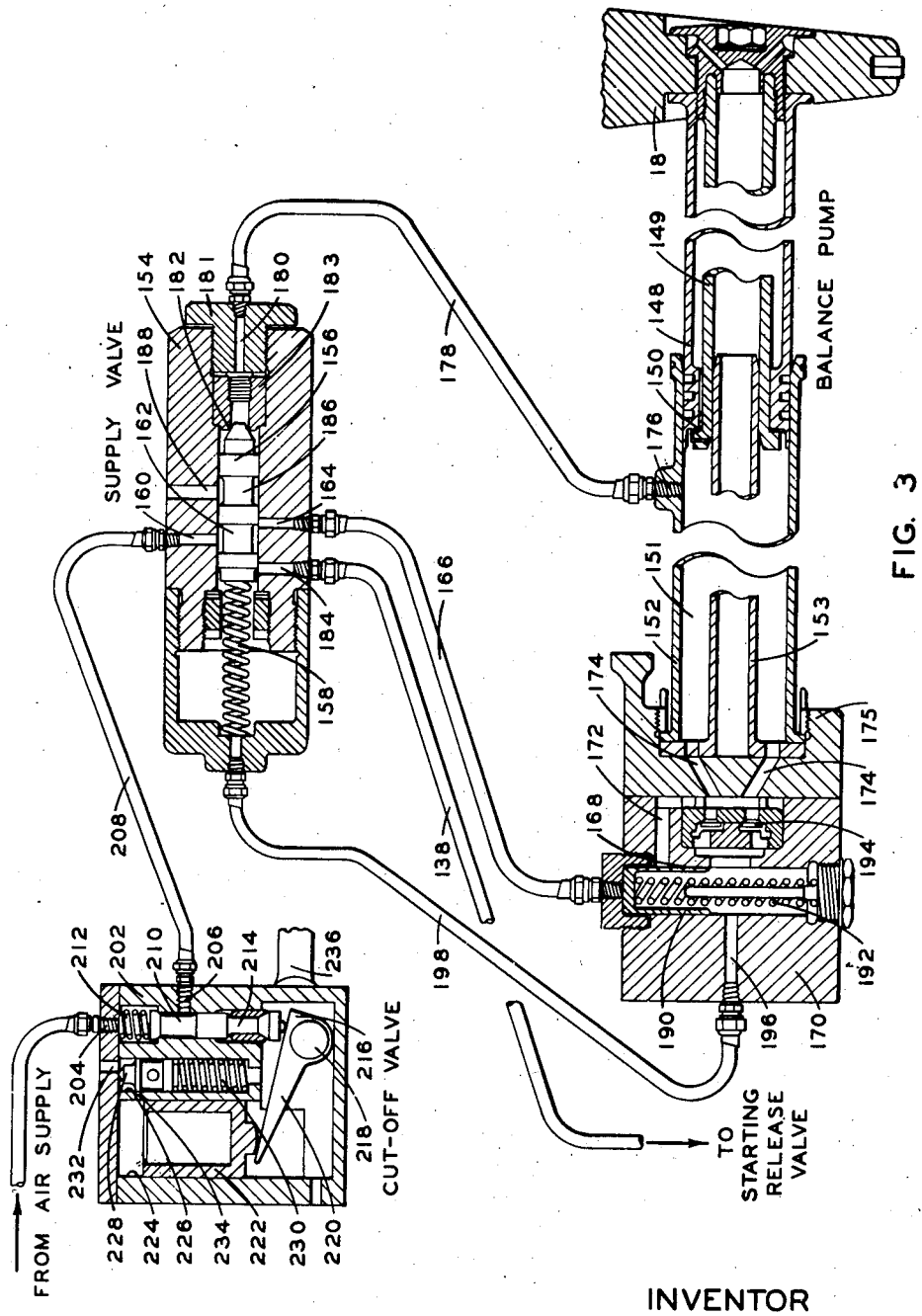
Fig. 3 is a diagrammatic view of the cut-off valve and the control valve for the starting system.

Referring to Fig. 3, the supply of starting gas to the above described structure may be controlled by a starting cut-off valve. This valve includes a casing 202 having an inlet port 204 connected to a source of gas under pressure and an outlet port 206 connected by a conduit 208 to port 160 of casing 154. Between ports 204 and 206 is a valve 210 held against its seat by a spring 212 and normally preventing gas from passing between the ports. The valve 210 has a stem 214, the end of which engages a lever 216 on a shaft 218. A projecting arm 220 on lever 216 engages the end of a piston 222 in a bore 224 in casing 202. Downward movement of the piston (upward movement in Fig. 5) moves the valve stem to open valve 210.

In a bore 226 also in casing 202 is a valve plunger 228 normally held in the position shown by spring 230 and moved downwardly (upwardly, Fig. 5) by gas under pressure entering port 232 to uncover a connecting port 234 between bores 224 and 226. When port 234 is uncovered pressure entering bore 224 moves the piston down to open valve 210 and permit the starting device to operate.

Figure 5:
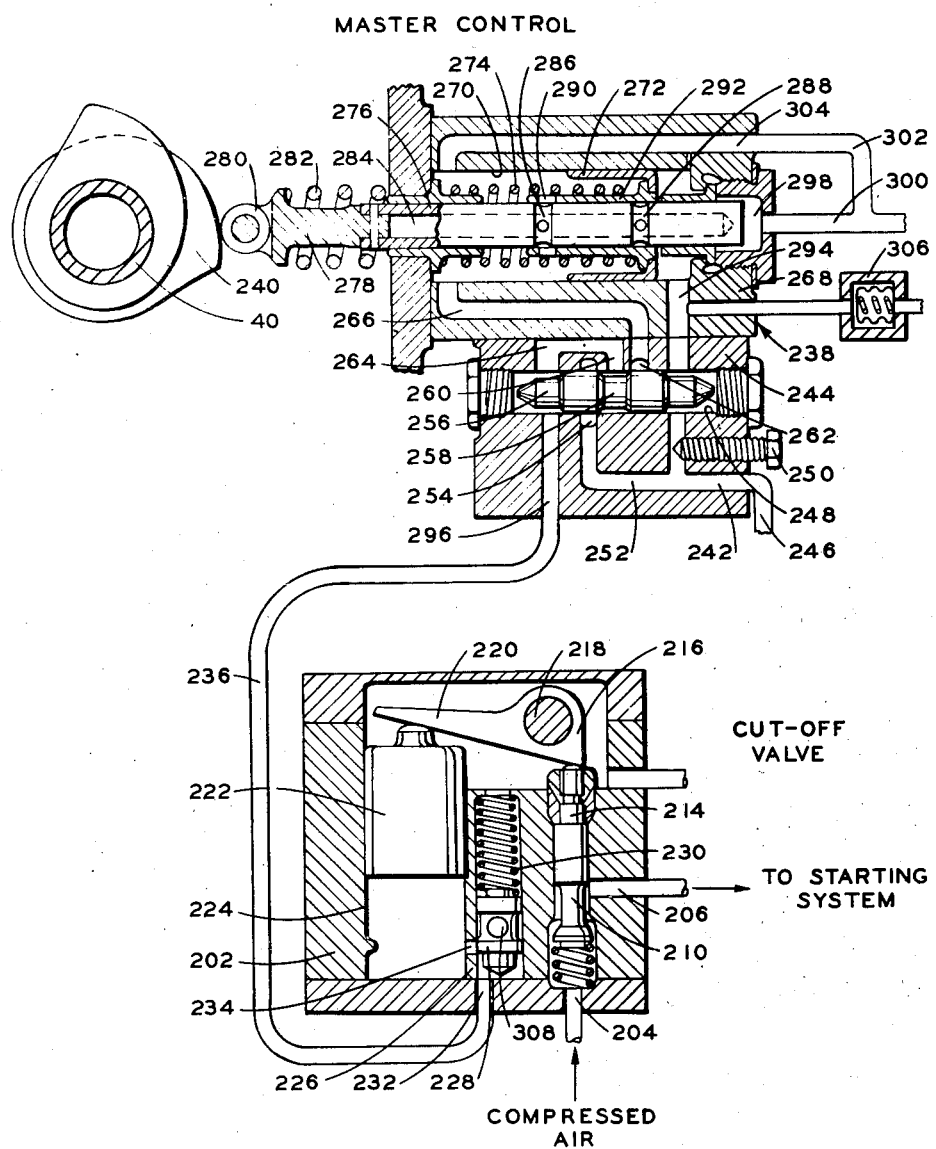
Fig. 5 is a diagrammatic view of the master control and the cut-off valve.

Port 232 is connected by a conduit 236 with a master control 238 which varies the pressure in conduit 236 in accordance with the spacing of the actual outer end of the piston stroke from the extreme outer end position of the piston. As shown in Fig. 5 this control is actuated by a cam 240 on shaft 40. Since the pinion 38 on this shaft is oscillated directly from the pistons the movement of cam 240 is proportional to the piston stroke.

Fluid under pressure from a constant pressure source enters a passage 242 in a casing 244 forming a part of the control 238. Passage 242 is connected to the source by a conduit 246. Passage 242 intersects a bore 248 adjacent its outer end and a throttling screw 250 controls the rate of flow into bore 248. A branch passage 252 from passage 70 connects with a port 254 in bore 248. A plunger 256 in bore 248 has a groove 258 which connects a port 260 alternately with port 254 or with a port 262. Port 260 is connected by a passage 264 to the inner end of bore 248. Port 262 is connected by a channel 266 in casing 244 and in an adjacent casing 268 to the inner end of a bore 270 in casing 268.

A piston 272 in bore 270 is moved to the right by a calibrated spring 274. A plunger 276 extends through the piston and carries on its projecting end a push rod 278. This rod has a roller 280 held against a cam 240 by a spring 282. Plunger 276 has a central passage 284 connecting with spaced grooves 286 and 288 in the plunger. Groove 286 aligns with openings 290 in a sleeve 292 carried by piston 272, and groove 288 is adapted to be uncovered by the end of sleeve 292 as the plunger is moved to the right by cam 240 as the piston approaches the outer end of its stroke.

Fluid under pressure from the right-hand end of bore 248 enters the outer end of bore 270 through a connecting channel 294 moving piston 272 against the action of spring 274. As plunger 276 is moved to the right by cam 240 the groove 288 is uncovered by sleeve 292 to permit discharge of fluid from the right-hand end of bore 270. The pressure in the outer end of bore 270 varies in accordance with the compression of spring 274 and as the piston stroke becomes shorter the piston 272 moved inward, increasing the spring tension and increasing the pressure at the end of bore 270.

Since the change in the pressure on the outer end of the plunger 256 is proportional to the change in the position of the piston stroke the pressure on the inner end of plunger 256 which balances the pressure on the outer end must vary in the same manner. In this way, the pressure in conduit 236 which is connected by a channel 296 to the inner end of bore 248 is proportional to the spacing of the actual end of the piston stroke from the extreme outer position of the piston. Changes in pressure in conduit 236 will be proportional to changes in the outer end position of the piston stroke. The pressure and change in pressure in the conduit control the operation of the cut-off valve.

The outer end of plunger 276 may reciprocate in a chamber 298 which may be connected by a conduit 300 to the conduit 302, connected by passage 304 to the inner end of bore 270. A bellows 306 connected with passage 204 may be used to reduce pressure fluctations in the control.

In operation, when the unit is stopped, the engine pistons are between the ends of their strokes causing a high pressure to be indicated by the master control, Fig. 5. This high pressure in conduit 236 acts to hold plunger 228 in the position shown, permitting entry of fluid to bore 224 and moving piston 222 into the up position of Fig. 5 so that valve 210 is open to admit starting air to the starting system. As soon as the unit is operating, the pressure in conduit 236, as indicated by the master control, drops, thereby cutting off the flow of fluid under pressure to bore 224 and permitting fluid from this bore to exhaust through a passage 308 in plunger 228. The piston 222 then moves downward, Fig. 5, thereby closing valve 210 and cutting off the supply of starting air to the starting system. As a result, the operation of the starting system is under the control of the free-piston unit so that the starting system, which is completely automatic, will be supplied with starting and cranking air while the unit is not running to cause the starting system to operate for starting the unit. Immediately the unit begins its operation the master control pressure drops, the cut-off valve is closed and the starting system remains inoperative unless the unit stalls. The air spring pressures and the other pressures acting on the piston assembly cause the piston assembly to come to rest, when the unit stalls, at a point spaced substantially from the outer end of the piston stroke, thereby producing a high pressure indication by the master control which will cause the cut-off valve to open.

It is to be understood that the invention is not limited to the specific embodiment herein illustrated and described, but may be used in other ways without departure from its spirit as defined by the following claims.

I claim:

1. A free-piston unit having a cylinder, a piston reciprocating in the cylinder, a fluid pressure actuated starting system for the unit, and a cut-off valve for controlling the supply of fluid under pressure to said system, in combination with a stroke indicator operative during the operation of the unit for indicating the end positions of successive piston strokes, and means under the control of said indicator for operating the cut-off valve to close it during operation of the unit.

2. A free-piston unit having a cylinder, a piston reciprocating in the cylinder, a fluid pressure actuated starting system for the unit, and a cut-off valve for controlling the supply of fluid under pressure to said system, in combination with a hydraulic system, a hydraulic stroke indicator having means for adjusting the pressure in the hydraulic system in accordance with changes in the end position of the piston strokes, and means for actuating said cut-off valve in response to changes in pressure in said hydraulic system.

3. A free-piston unit having opposed pistons, a cylinder in which said pistons reciprocate, air springs for each piston, and a fluid pressure actuated starting system for said unit including fluid pressure actuated means for moving the pistons into starting position, and means rendered operative by movement of said pistons into starting position for supplying fluid under pressure to said air springs for causing said pistons to move simultaneously for starting, in combination with a control system, means responsive to changes in the location in the ends of successive piston strokes during operation of the unit for procuring changes in the pressure in the control system, and means responsive to changes in the pressure in the system for controlling the supply of fluid under pressure to said starting system.

4. A free-piston unit including a cylinder, a piston reciprocating in the cylinder, and starting means for the unit, including means for moving the piston into starting position, means for imparting a stroke to the piston from starting position, and means responsive to said piston movement into starting position for setting said other means in operation, in combination with means for stopping the operation of said starting means and means responsive to reciprocation of the piston in the cylinder during operation of the unit for actuating said stopping means.

5. A free-piston unit including a cylinder, a piston in the cylinder, and fluid pressure actuated starting means for the unit, including means for moving the piston into starting position, means for imparting a stroke to the piston from starting position and means responsive to said piston movement into starting position for setting said other means in operation, in combination with means for cutting off the supply of fluid under pressure to said starting means, and means responsive to reciprocation of the piston in the cylinder during operation of the unit for actuating said cut-off means.

6. A free-piston unit including a cylinder, a piston in the cylinder, and a fluid pressure actuated starting system including means for moving the piston into a position for starting, other means for imparting a stroke to the piston, both of said means being actuated by fluid under pressure, and means responsive to said piston movement into starting position for setting said other means in operation in combination with means for cutting off the supply of fluid under pressure to said system, and means responsive to successive reciprocations of the piston during normal operation of the unit for actuating said cut-off means.

DONALD E. MEITZLER.

REFERENCES CITED

The following references are of record in the file of this patent:

UNITED STATES PATENTS

| Number | Name | Date |
|---|---|---|
| 2,084,823 | Pescara | June 22, 1937 |
| 2,168,828 | Pescara | Aug. 8, 1939 |
| 2,178,310 | Pescara | Oct. 31, 1939 |
| 2,189,497 | Pescara | Feb. 6, 1940 |
| 2,215,326 | Janicke | Sept. 17, 1940 |
| 2,222,260 | Janicke | Nov. 19, 1940 |
| 2,344,058 | Pescara | Mar. 14, 1944 |
| 2,408,031 | Beale | Sept. 24, 1946 |
| 2,434,778 | Walsh | Jan. 20, 1948 |

FOREIGN PATENTS

| Number | Country | Date |
|---|---|---|
| 462,668 | Great Britain | Mar. 9, 1937 |
| 541,779 | Great Britain | Dec. 11, 1941 |

OTHER REFERENCES

Ser. No. 418,666, Mullejans et al. (A. P. C.), published June 15, 1943.